E. FETTER.
SELF HEALING TUBE.
APPLICATION FILED DEC. 31, 1921.

1,427,277. Patented Aug. 29, 1922.

Inventor
Edward Fetter

UNITED STATES PATENT OFFICE.

EDWARD FETTER, OF BALTIMORE, MARYLAND.

SELF-HEALING TUBE.

1,427,377. Specification of Letters Patent. Patented Aug. 29, 1922.

Application filed December 31, 1921. Serial No. 526,229.

*To all whom it may concern:*

Be it known that I, EDWARD FETTER, a citizen of the United States of America, residing in the city of Baltimore, State of Maryland, have invented certain new and useful Improvements in Self-Healing Tubes, of which the following is a specification.

Self-healing pneumatic tires and inner tubes are widely discussed in the patents and in the literature relating to this art. The manufacture and sale of such tires and tubes is compartively limited because few if any of them have produced a permanently favorable impression in actual use.

The provision of a pocket containing puncture healing material in the wall of an inner tube or of a single tube tire is a comparatively old idea being disclosed in several expired patents. According to the theory of operation any hole or puncture formed in the tube is immediately filled by means of the self-healing material which is liquid or semi-liquid composed of partially oxidized linseed or other oils, rubber and of gummy materials which may be dissolved or partially dissolved in volatile liquids which evaporate immediately on exposure to the air. This material being hardened as aforesaid by exposure to the air, forms a plug which produces a more or less satisfactory result in the way of closing the puncture.

According to the observations of the applicant the result is never entirely satisfactory because none of the self-healing materials so far as they are known to the applicant adhere strongly or permanently to the rubber forming the walls of the tube or tire and therefore the closing of the puncture is in almost every instance temporary because the plug of self-healing material not being closely attached to the rubber, eventually blows out leaving the opening free. One object of the present invention is to overcome the difficulty incident to the lack of adhesiveness between the self-healing material and the rubber.

The applicant has ascertained that raw rubber adheres not only to the cured rubber of which such tubes and tires are made, but that the self-healing material also adheres to the raw rubber. By providing the pocket in the walls of the tube with a lining of raw rubber so that the raw rubber is always interposed between the self-healing material and the cured rubber, the applicant has overcome the difficulty incident to the lack of adhesiveness by joining the material to be sealed, i. e., the cured rubber to the sealing material which is the healing liquid or semi-liquid contained in the pocket.

It will be easily understood that the entrance of the sealing material into the puncture is dependent upon pressure from within the tube and that the degree of efficiency with which the puncture is closed is dependent partly on this pressure and partly to the resistant opposed to it by the walls of the tube, i. e., the resistance of it to an enlargement of the puncture which might result in failure to seal the opening.

In the present instance the applicant has provided an outer coating of inelastic fabric which is vulcanized into the rubber or caused to adhere thereto when the tube is flat. The external layer of inelastic fabric serves when the tube is inflated, and therefore round, to place the pocket under tension and contract the inner wall of the tube. Under these circumstances a slight puncture in the rubber walls of the pocket even in the absence of considerable pressure due to inflation, would, on account of the tension set up by this non-elastic fabric, cause the healing material to be immediately injected into the opening. Also the contraction of the inner wall of the tube helps to close the puncture.

In the accompanying drawing, I have illustrated an inner tube for an automobile tire constructed in accordance with my invention.

In the drawing

Figure 1:
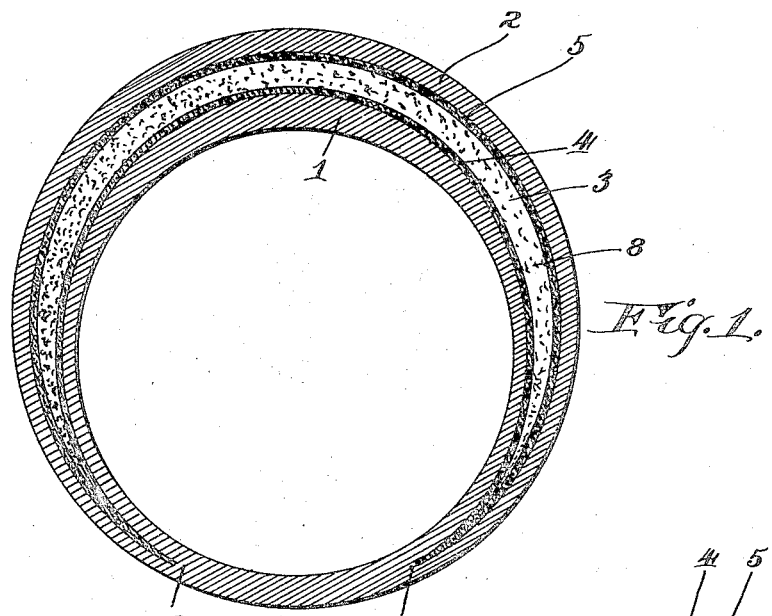
Figure 1 is a transverse section through the tube showing the pocket and lining in accordance with my invention.

Referring to the drawings by numerals, the inner tube as shown is formed with inner and outer walls 1 and 2 respectively of any suitable rubber or composition known as elastic rubber, the material being compounded in accordance with the present practice in the manufacture of tubes, the inner and outer walls 1 and 2 are spaced apart or formed separately for a considerable portion of the circumference providing a pocket 3 which may be filled with any suitable puncture filling composition, such compositions being usually semi-liquid and ordinarily formed of gum dissolved in, or more properly thinned by means of a suitable solvent. It having been found that the known puncture filling compositions are lacking in adhesive qualities in connection with vulcanized rubber which lack results in the blowing out of the plug formed by the entrance of the sealing material into the punctures in the rubber. I have provided the pocket in the present instance with an internal lining 4 and external lining 5 of unvulcanized rubber which possesses marked adhesive properties in connection with both puncture filling or sealing composition and vulcanized rubber. The raw gum which I use is preferably free from sulphur or other vulcanizing material so that the remainder of the tube may be heat treated without affecting the raw rubber lining. Heating will also result at times, particularly in hot weather incident to the ordinary use of the tube in a tire or casing, and it is necessary that the pocket lining even though it be inserted after vulcanization of the tube should be without vulcanizing ingredients, i. e., in the nature of a pure gum to prevent deterioration of its adhesive properties.

The tube as illustrated may be produced by forming two tubes of vulcanizable rubber, i. e., raw rubber mixed with a vulcanizing material as sulphur, one within the other, the same being in contact throughout a small portion of the periphery indicated by reference characters 6, 7, the two tubes being separated throughout the remainder of the circumference to provide the pocket 3 coextensive with the tread surface, the same being filled with a self-healing material or gum 8 and lined with raw rubber 4, 5. The lining and healing material may be arranged as shown and described either before or after vulcanization. The arrangement of the parts as aforesaid is most convenient and is a practical manufacturing method because of the use of a pure gum in the lining so that both the lining and filler are unaffected by the heat treatment.

It will be understood from the description that the tube which is the subject of my invention is composed of elastic rubber or of suitable material having embodied in the tread wall a stratum of puncture sealing composition being separated from the elastic rubber by a stratum of unvulcanized rubber.

My invention further relates to the provision of a feature in connection with a self-healing tube whereby the elasticity of the outer wall of the tube is considerably reduced preventing to a great extent stretching of holes and punctures and contributing to the successful and permanent healing of such punctures.

A more important function of this additional feature of applicant's invention resides in the fact that by its use the self-healing material in the pocket is when the tube is inflated, placed under compression and the inner wall of the tube is likewise contracted, the compression of the self-healing material serves to give added efficiency in injecting it into any punctures which may be formed and the contraction of the inner wall of the tube not only reduces the liability to puncture but tends to close such openings from within when formed, or more particularly when the puncturing agent is withdrawn, assisting the operation of the self-healing material and closing the puncture.

Figure 2:
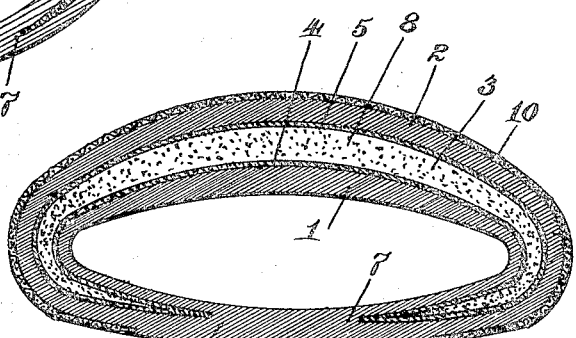
Figure 2 is a similar section showing the tube flattened with a piece of fabric imbedded in the outer wall of the pocket which corresponds to the tread surface.
Figure 3:
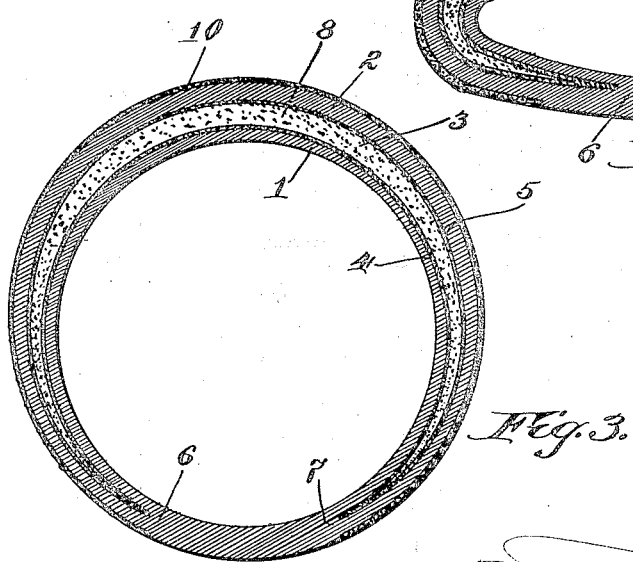
Figure 3 is a section corresponding to Figure 1 showing the tube with the fabric reinforced applied to the outer wall, duly inflated to its round shape in which the fabric is placed under tension and the sealing material in the pocket is placed under compression and the inner wall contracted.

More particularly this feature of my invention relates to the provision of a layer of fabric 10 vulcanized to or into the outer wall 2 of the tube covering, or substantially covering, the tread portion thereof, the affixing of this fabric to the tube being preferably accomplished when the tube is flat or substantially flat as shown in Figure 2 so that when the tube is inflated and becomes round in cross section, there is a tendency to stretch the fabric as the outer periphery is curved tending to expand which being positively resisted by the fabric which is in effect inelastic contracts the inner wall 1 and places the material 3 in the pocket under compression.

The operation of the device has been fully described in the preamble and in connection with the description of the structure.

I have thus described specifically and in detail a single preferred embodiment of my invention and the different features thereof in the preferred form in order that the nature and operation of the same may be clearly understood. However, the specific terms herein are used specifically rather than in a limiting sense the scope of the invention being defined in the claims.

What I claim and desire to secure by Letters Patent is:

1. A pneumatic tube composed of elastic rubber having a pocket in the wall thereof, a stratum of raw unvulcanized rubber lining the pocket and a puncture sealing composition in said pocket.

2. An inner tube for a pneumatic tire composed of elastic rubber and having a stratum of puncture sealing composition in the tread portion thereof, a stratum of raw rubber between the puncture sealing composition and the elastic rubber and a layer of fabric secured to the outer portion of the tread wall and of dimension corresponding to the dimensions of said wall when the tube is flat so that it is placed under tension when the tube is inflated.

Signed by me at Baltimore, Maryland, this 21st day of December, 1921.

EDWARD FETTER.

Witnesses:
PORTER H. FLAUTT,
CARRIE M. REELY.